UNITED STATES PATENT OFFICE.

GEORGE SWEANOR, OF MONTREAL, ASSIGNOR TO THE NEPTUNE FOG HORN COMPANY, (LIMITED,) OF QUEBEC, PROVINCE OF QUEBEC, CANADA.

IMPROVEMENT IN FOG-SIGNALS.

Specification forming part of Letters Patent No. 194,937, dated September 4, 1877; application filed August 15, 1877.

*To all whom it may concern:*

Be it known that I, GEORGE SWEANOR, of the city and district of Montreal, in the Province of Quebec, in the Dominion of Canada, have invented certain new and useful Improvements on Fog-Signals; and I do hereby declare that the following is a full, clear, and exact description of the same.

The object of the invention is to sound a whistle or horn at regular intervals by means of a winding mechanism operating automatically; and the invention consists, first, of the combination of an air-cylinder having a piston automatically dropping therein by its gravity, to force air through a horn having a whistle or one or more reeds, to give audible sound, a spring-clutch, lever, and cam mechanism, for lifting said piston, and letting off the same at intervals, operated by train-wheels, one or more air-pumps or brakes for regulating the speed, and a winding-drum operated by a coiled spring or a rope and weight for producing the running-power, whereby sound is audibly produced at regulated intervals; second, in combination with the air-brakes or pumps, and the mechanism for operating the piston of the air-cylinder, a duplicate winding mechanism operating independently, whereby one of the drums may be wound while the other is giving off motive power.

Figure 1:
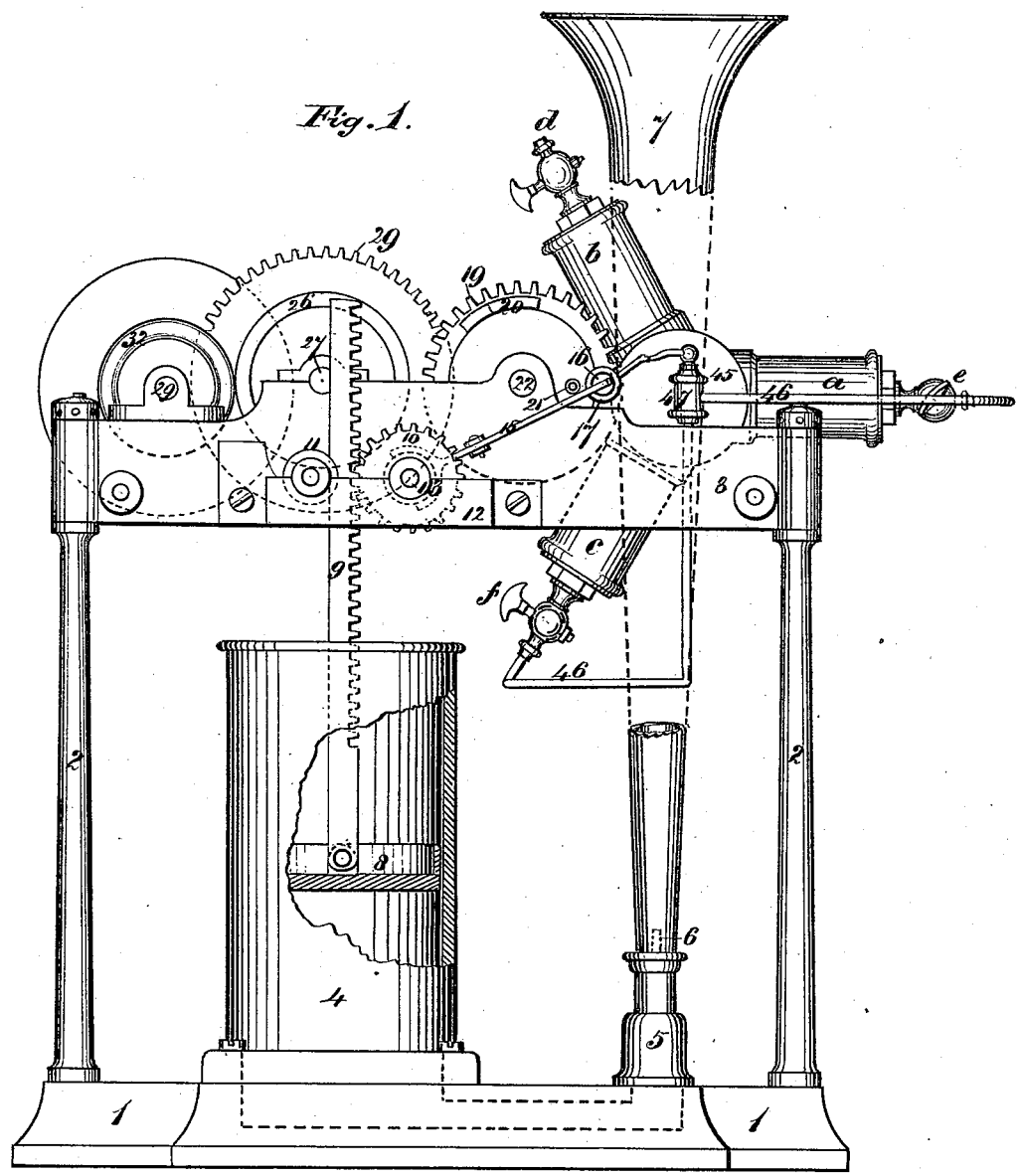
Figure 2:
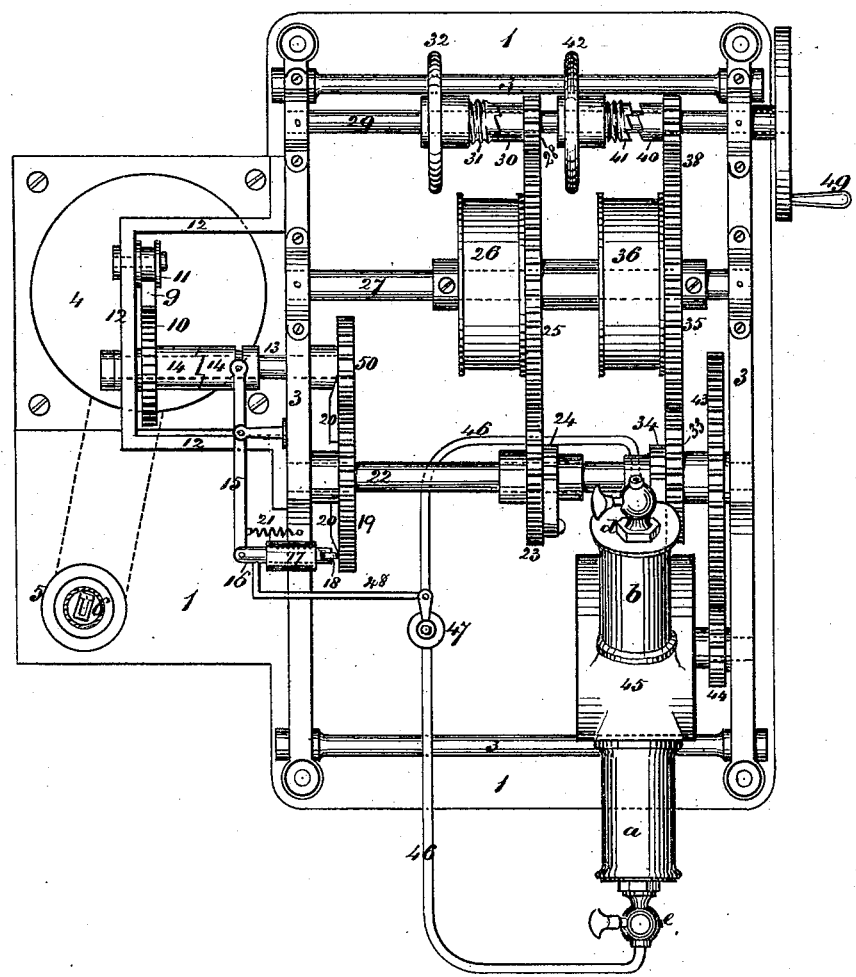

Figure 1 is a side elevation of my improved machine, and Fig. 2 is a plan view.

1 is a base for the columns 2, supporting the frame 3, on which the operating mechanism is mounted, the air-cylinder 4 standing on said base, and connected by an artery with a mouth-piece, 5, provided with a whistle, or one or more reeds, 6, within a horn, 7.

8 is a piston in the cylinder 4, having a rack-bar, 9, which engages with a loose pinion, 10. The bar 9 is kept in contact with 10 by a friction-wheel, 11, carried by the frame 12, bolted to the frame 3, in which frames are journaled the shaft 13, carrying the pinion 10 and clutch-gears 14, one part integral with the pinion 10, and the other sliding on the shaft 13, and operated by a lever, 15, one end pivoted to an arm, 16, sliding in a barrel, 17, secured to the frame 3. The free end of the arm is provided with a friction-wheel, 18, which is kept in frictional engagement with cog-wheel 19, having laterally two cams, 20, by a spiral spring, 21.

The pinion 50 on end of shaft 13 meshes with cog-wheel 19 on shaft 22, which carries loose pinion 23, having a pawl engaging with a ratchet-wheel, 24, fast on shaft 22, pinion 23 engaging with cog-wheel 25, secured to winding-drum 26, both loose on spindle 27, and cog-wheel 25 engages with loose pinion 28 on winding-shaft 29, pinion 28 having one part of a clutch, 30; the other part of the clutch 31 keyed to slide on shaft 29, and has a screw-thread fitting into a sleeve in the hub of a hand-wheel, 32, by which the clutches are engaged or disengaged by the screw-sleeve being projected or withdrawn by the operation of the hand-wheel. When in connection, and its shaft operated by a crank-handle, 49, by manual or other power, the drum is operated, winding a rope thereon, provided with a weight; or the drum may be provided with a coiled spring for giving the motive power; or the machine may be driven by hot air or steam-power.

To provide for winding the machine without stopping its operation, I employ duplicate winding mechanism consisting of the pinion 33 loose on shaft 22, having a pawl engaging with a ratchet-wheel, 34, fast on shaft 22, and pinion 33 engaging with cog-wheel 35, secured on winding-drum 36, both loose on spindle 27, and cog-wheel 35 engages with loose pinion 38 on winding-shaft 29, pinion 38 having one part of a clutch, 40, the other part of the clutch 41 keyed to slide on shaft 29, and has a screw-thread fitting into a sleeve in the hub of a hand-wheel, 42, by which the clutches are engaged or disengaged, as before described, for the clutch 30 31. Thus, while one drum is giving off power the other may be accumulating it by the winding of the rope thereon or the spring within. While one drum is giving off power its clutch mechanism should be out of engagement, thereby allowing its pinion to turn freely on shaft 29 without operating the other drum, which, when the power is nearly expended, is wound by turning its clutches into engagement and turning the shaft 29. By means of the duplicate winding-gears a long length of rope is dispensed with, oftener winding being performed. On shaft 22 is keyed cog-wheel 43, which meshes with pinion 44, keyed on a crank-shaft operating with the pump 45, which is provided with three cylinders, a b c, having piston-rods which connect with the crank-shaft of the pinion 44, and one of said cylinders is provided with a stop-cock, d, to regulate the inflow of air. When said cock is closed the machinery will stop, and on being opened to a greater or less extent the more or less speed will be allowed. The other two cylinders are provided with stop-cocks e and f, which are connected by a pipe, 46, provided with a stop-cock, 47, which is opened and closed by means of a rod, 48, attached to arm 16, to admit air to the cylinder at the proper time.

The operation of the machine is as follows: The drums are alternately wound by the shaft 29, and during the operation of winding the pawl slides over the ratchet-wheel of its pinion on shaft 22, the other drum meanwhile giving off power to drive the machinery, the speed of which is controlled by a greater or less inflow of air to the pump-cylinder admitted through the stop-cocks. The revolution of the wheel 19 brings its cams into engagement with arm 16, operating the lever 15, thus disengaging the clutch-gears 14 and freeing the pinion 10, which, revolving, allows the piston 8 to fall in the cylinder 4, and expels the air through the reeds or whistles and sounds the alarm. After a cam has passed the arm 16 the spiral spring 21 brings the clutch-gears 14 into engagement, and pinion 10 then operates to lift the piston 8 by its rack-bar 9, and when the arm 16 meets the next cam 20 the piston automatically falls, as before described.

I claim as my invention—

1. In combination with a winding mechanism, operating a piston in an air-cylinder for giving audible sound by means of a whistle or reed, two or more air-pumps, constructed substantially as described, and adapted to control the speed, and thereby regulate the intervals of sounds.

2. The combination, in a fog-signal giving audible sounds by means of compressed air, of a winding mechanism consisting of two sets of gears, one set capable of being wound while the other is running off, and a cylinder having a piston operated thereby to expel air through a whistle or reed for giving audible sound, all constructed substantially as set forth.

3. The combination, in a fog-signal giving audible sounds by means of air forced through a whistle or reed, of an air-cylinder having a piston automatically raised and dropped therein at intervals by the operation of a spring clutch and lever and cam, a train-wheel winding mechanism, and one or more air-pumps to regulate the length of interval between the sounds, all constructed substantially as set forth.

GEORGE SWEANOR.

Witnesses:
A. D. CABLE,
E. D. COBURN.